United States Patent
Lecolier et al.

(10) Patent No.: US 10,850,233 B2
(45) Date of Patent: Dec. 1, 2020

(54) FLUID FOR PURIFYING HEAT ENGINES USING STABLE SUSPENSIONS OF METAL COLLOIDAL PARTICLES, AND METHODS FOR PREPARING SAID FLUID

(71) Applicant: IFP Energies nouvelles, Rueil-Malmaison (FR)

(72) Inventors: Eric Lecolier, Chaville (FR); Patrick Gateau, Maurepas (FR); Stephane Zinola, Charly (FR); Nathalie Palazzo, Sartrouville (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 205 days.

(21) Appl. No.: 15/770,801

(22) PCT Filed: Oct. 20, 2016

(86) PCT No.: PCT/EP2016/075198
§ 371 (c)(1),
(2) Date: Apr. 25, 2018

(87) PCT Pub. No.: WO2017/080779
PCT Pub. Date: May 18, 2017

(65) Prior Publication Data
US 2018/0304198 A1   Oct. 25, 2018

(30) Foreign Application Priority Data

Nov. 13, 2015   (FR) ..................... 15 60906

(51) Int. Cl.
*B01D 53/90*   (2006.01)
*B01J 13/00*   (2006.01)
*B01D 53/94*   (2006.01)
*F01N 3/029*   (2006.01)
*F01N 3/20*   (2006.01)

(52) U.S. Cl.
CPC ........... *B01D 53/90* (2013.01); *B01D 53/944* (2013.01); *B01D 53/9409* (2013.01); *B01J 13/0047* (2013.01); *F01N 3/0293* (2013.01); *B01D 2251/206* (2013.01); *B01D 2251/2067* (2013.01); *B01D 2251/602* (2013.01); *B01D 2251/604* (2013.01); *B01D 2251/606* (2013.01); *B01D 2255/20738* (2013.01); *B01D 2258/012* (2013.01); *B01D 2259/126* (2013.01); *F01N 3/2066* (2013.01); *F01N 2610/01* (2013.01); *F01N 2610/02* (2013.01)

(58) Field of Classification Search
CPC .. B01D 53/90; B01D 53/9409; B01D 53/944; B01J 3/0047; F01N 3/0293
USPC .......................................................... 516/88
See application file for complete search history.

(56) References Cited

U.S. PATENT DOCUMENTS

| | | | |
|---|---|---|---|
| 6,051,040 | A | 4/2000 | Peter-Hoblyn |
| 2007/0101659 | A1 | 5/2007 | Choung et al. |

FOREIGN PATENT DOCUMENTS

| | | |
|---|---|---|
| EP | 2541012 A2 | 1/2013 |
| FR | 1462228 A | 4/1966 |
| FR | 2885308 A1 | 11/2006 |
| FR | 2947004 A | 12/2010 |
| WO | 2014/142661 A2 | 9/2014 |

OTHER PUBLICATIONS

International Search Report for PCT/EP2016/075198, dated Jan. 16, 2017; English translation submitted herewith (7 pgs.).

*Primary Examiner* — Edward J Cain
(74) *Attorney, Agent, or Firm* — Fitch, Even, Tabin & Flannery, LLP

(57) ABSTRACT

The present invention describes a fluid which is suitable for the decontamination of heat engines which can carry out both the catalytic reduction of oxides of nitrogen (NOx) contained in exhaust gases and assist in the regeneration of the particulate filter (PF), said fluid being in the form of a stable suspension of colloidal particles, these colloidal particles being dispersed in an aqueous solution containing at least one reducing agent or at least one precursor of a reducing agent for NOx. The invention also describes several embodiments for the preparation of said fluid.

21 Claims, No Drawings

FLUID FOR PURIFYING HEAT ENGINES USING STABLE SUSPENSIONS OF METAL COLLOIDAL PARTICLES, AND METHODS FOR PREPARING SAID FLUID

CROSS-REFERENCE TO RELATED APPLICATIONS

This application is a U.S. national phase application filed under 35 U.S.C. § 371 of International Application No. PCT/EP2016/075198, filed Oct. 20, 2016, designating the United States, which claims priority from French Patent Application No. 15/60.906, filed Nov. 13, 2015, which are hereby incorporated herein by reference in their entirety.

FIELD OF THE INVENTION

The present invention describes a single fluid for automobile decontamination, enabling two distinct operations to be carried out: selective catalytic reduction of NOx using Selective Catalytic Reduction technology, usually given the acronym SCR, as well as with assisting in the regeneration of the particulate filter (PF), this aid to regeneration possibly manifesting itself either by promoting the continuous regeneration of the particulate filter or by accelerating the combustion of soot during the active regeneration phases of the PF, or by a combination of these two advantages. The composition in accordance with the invention is homogeneous and has the characteristics of stability over time, or upon variations in the temperature or pH. The present invention describes various embodiments for the production of the fluid as well as the embodiment for use of this fluid.

PRIOR ART

Various technologies have been applied in order to reduce the harmful emissions of exhaust gases which are emitted from diesel heat engines, in particular oxides of nitrogen (NOx) and particles.

One example of an exhaust line integrating the system for the treatment of NOx by selective catalytic reduction (denoted SCR, the abbreviation for Selective Catalytic Reduction), and the particulate filter (abbreviated to PF) is given in the patent FR 2 947 004. These two decontamination systems may also be combined into a single module which is known by the term SCR on filter or SCRF or SDPF or SCRoF.

We have not found a fluid composition in the literature which can be used to combine the functions of reducing oxides of nitrogen and assisting in the regeneration of trapped particles of soot.

AdBlue® (or AUS32 or DEF or ARLA32) is a 32.5% by weight solution of urea in pure water which is used for the selective reduction of oxides of nitrogen in the context of SCR technology for road and non-road applications.

The general concept of mutualisation of these decontamination functions formed the subject matter of the French patent application 14/62.228 filed at the end of 2014. The present application may be considered to be an improvement of the application 14/62.228.

BRIEF DESCRIPTION OF THE INVENTION

The present invention describes a fluid for the decontamination of heat engines, in particular diesel engines, in order to be able to carry out the selective catalytic reduction of oxides of nitrogen contained in exhaust gases (the function termed SCR) at the same time as assisting in the regeneration of the particulate filter (PF) by catalytic combustion of particles of soot deposited in the particulate filter (the function termed assistance in the regeneration of PF), this regeneration assistance possibly being manifested either by promotion of the continuous regeneration of the particulate filter or by accelerating the combustion of soot during the active PF regeneration phases, or by a combination of these two advantages.

The use of a catalyst for the oxidation of soot differs from the prior art cited above in that it is injected directly into the exhaust and thus does not pass through the combustion chamber of the engine. Injection of fluid in accordance with the invention is triggered by the engine computer in order to respond to a need to provide the necessary quantity of ammonia over the SCR catalyst in order to carry out efficient reduction of the NOx. The injections are carried out in a regular manner in accordance with a period which is typically in the range from a few milliseconds to a few tens of seconds depending on the operational conditions of the engine, which means that homogeneous mixing of the catalyst with the soot can be promoted and intimate contact between the soot and the catalyst can be guaranteed.

Finally, the fact of injecting the fluid in accordance with the invention means that either the phenomenon of continuous regeneration of the particulate filter is promoted, and thus the active PF regeneration periods can be spaced apart, or that combustion of the soot during the active PF regeneration phases is accelerated, meaning that fuel consumption relative to this phase can be limited and/or the chances of burning a large mass of soot when the temperature and gas composition conditions in the exhaust are favourable to this active regeneration are maximized, or a combination of these two advantages.

The fluid in accordance with the invention is in the form of a stable suspension of colloidal particles incorporating one or more atomic elements which are known to catalyse the combustion of soot, these colloidal particles being dispersed in an aqueous solution containing at least one reducing agent or at least one precursor of a reducing agent for the NOx. The colloidal particles used in accordance with the invention contain at least one of the following metals: Fe, Cu, Ni, Co, Zn, Mn, Ti, V, Sr, Pt, Ce, Ca, Li, Na, Nb.

The colloidal particles may be either particles of metal oxides or oxyhydroxides or metal carbonates, or a combination of the two.

The compositions of the fluid in accordance with the invention are constituted by a dispersion of colloidal particles of metal oxides or oxyhydroxides or metal carbonates in a solution of at least one reducing compound or precursor of a reducing agent, the metal or metals of the metal oxides or oxyhydroxides or the metal carbonates being selected from the following list of metals: Fe, Cu, Ni, Co, Zn, Mn, Ti, V, Sr, Pt, Ce, Ca, Li, Na, Nb.

Preferably, the metal or metals of the metal oxides or oxyhydroxides or the metal carbonates are selected from the following list: Fe, Ce, Cu, Sr.

Preferably, the reducing compound or compounds or the precursor or precursors of a reducing agent in aqueous solution are selected from urea, ammonia, formamide, and ammonium salts, in particular ammonium formate, ammonium carbamate, and guanidine salts, in particular guanidinium formate.

Preferably, the concentration of metal oxides or oxyhydroxides or metal carbonates is such that the concentration of metal ions in the solution of the reducing compound or precursor of a reducing agent is in the range 10 to 10000 ppm, preferably in the range 10 to 5000 ppm, and more preferably in the range 10 to 2000 ppm.

In accordance with a preferred variation of the invention, the dispersion of colloidal particles is constituted by oxides or oxyhydroxides or carbonates of iron of mineral or synthetic origin.

In accordance with a variation of the invention, the iron oxides, used alone or as a mixture, are selected from the following list: wustite FeO, haematite $\alpha$-$Fe_2O_3$, maghemite $\gamma$-$Fe_2O_3$ and magnetite.

In accordance with another variation of the invention, the iron oxyhydroxides, used alone or as a mixture, are selected from the following list: goethite $\alpha$-FeO(OH), lepidocrocite $\gamma$-FeO(OH), feroxyhyte $\delta$-FeO(OH), akaganeite $\beta$-FeO(OH), ferrihydrite $Fe_5O_8 \cdot 4H_2O$, bernalite $Fe(OH)_3$, and ferrous hydroxide $Fe(OH)_2$.

In accordance with another preferred variation of the invention, the dispersion of colloidal particles is constituted by oxides or hydroxides or carbonates of copper of mineral or synthetic origin.

In accordance with another preferred variation of the invention, the dispersion of colloidal particles is constituted by oxides or oxyhydroxides or carbonates of cerium of mineral or synthetic origin.

In accordance with another preferred variation of the invention, the dispersion of colloidal particles is constituted by oxides or oxyhydroxides or carbonates of strontium of mineral or synthetic origin.

In accordance with another variation of the invention, the reducing agent or the reducing agent precursor is urea, 32.5±0.7% by weight in solution in demineralized water or pure water in accordance with the specifications of the standard ISO 22241.

In accordance with a highly preferred variation of the present invention, the solution containing the reducing compound or compounds or the precursor or precursors of a reducing agent of the reducing compound is prepared from a product which satisfies the specifications of the standard ISO 22241, for example the commercial products AdBlue®, DEF, AUS32 or ARLA32.

In accordance with another preferred variation of the present invention, the solution containing the reducing compound or compounds or the precursor or precursors of a reducing agent is prepared from a product having the physical and chemical characteristics of the standard ISO 22241-1, for example the commercial product Diaxol®.

Hereinbelow, the term Adblue® will be used to designate any of the following products: Adblue®, DEF, AUS32, ARLA32 or Diaxol®.

The present invention also concerns a process for the production of fluid for engine decontamination.

The production process consists of dispersing colloidal particles incorporating at least one metal in an aqueous solution containing at least one reducing agent or at least one precursor of a reducing agent for NOx.

When the material which constitutes the colloidal particles has an isoelectric point which is either more than 12 or less than 7, the particles may be dispersed directly in an aqueous solution with a pH in the range 9 to 10 and containing at least one reducing agent or at least one precursor of a reducing agent for NOx. In this case, a step which is known as functionalization of the particles is not necessary a priori. In this case, the colloidal particles may be dispersed directly in a solution of AdBlue®, the suspension of colloidal particles obtained thereby being stable in respect of aggregation and sedimentation.

In the case in which the isoelectric point of the material which constitutes the colloidal particles is in the range 7 to 12, then a step for functionalization of said particles is always necessary.

In the general case, the process for the production of fluid for engine decontamination in accordance with the present invention consists of the following sequence of steps:
a) synthesis of particles of metal oxides or oxyhydroxides or carbonates,
b) functionalization of the particles of metal oxides or oxyhydroxides or carbonates by organic molecules or by coating in order to stabilize said particles in the aqueous solution containing a reducing agent or precursor of a reducing agent for NOx,
c) purification by filtration, or filtration-washing, or rinsing, or dialysis, the processes being applied alone or in combination, of the suspensions of particles of metal oxides or oxyhydroxides or carbonates,
d) dispersion of the functionalized particles of metal oxides or oxyhydroxides or carbonates in an aqueous solution containing at least one reducing agent or at least one precursor of a reducing agent for NOx in accordance with one of the modes below:
mechanical agitation with the aid of an agitator equipped with either a helical screw comprising a certain number of blades, or any other equipment which is known to provide effective stirring of the suspension,
agitation with a high shear homogenizer-disperser,
agitation with a colloidal mill,
e) dispersion with the aid of an ultrasound probe.

Step e) is either carried out as a function of the result and the efficiency obtained at the end of the mechanical dispersion step of step d) (in this case this step e) is optional), or carried out in place of the mechanical agitation step of step d).

In accordance with a variation of the process for the production of fluid for engine decontamination in accordance with the invention, the step b) for functionalization of the particles of metal oxides or oxyhydroxides or carbonates is carried out by using organic ionic polymer type molecules carrying at least one of the following chemical groups: amine, carboxylate, phosphate, sulfate, sulfonate, or using non-ionic polymer types: polyoxyethylenes, sugars, polysaccharides, dextran, starch.

In accordance with another variation of the process for the production of fluid for engine decontamination in accordance with the invention, step b) for functionalization of the particles of metal oxides or oxyhydroxides or carbonates is carried out by using organic molecules selected from the following list: citric acid, trisodium citrate, gluconic acid, dimercaptosuccinic acid, phosphocholine, the sodium salt of 4,5-dihydroxy-1,3-benzenedisulfonic acid (Tiron), polysulfobetain, poly(sulfobetain methacrylate), poly(sulfobetain methacrylamide), dextran, carboxymethyl dextran, alginate, chitosan, polyvinyl alcohol (PVA), polyvinylpyrrolidone, polyethylene glycol, poly(acrylic acid), sodium polyacrylate, poly(methacrylic acid), sodium polymethacrylate, polymethacrylamide, polyacrylamide, ethylcellulose, poly (ethylene oxide), polyethyleneimine, polycaprolactone.

In accordance with another variation of the process for the production of fluid for engine decontamination in accordance with the invention, step b) for functionalization of the particles of metal oxides or oxyhydroxides or carbonates is carried out by using surfactant type molecules selected from the following list: quaternary ammonium, tetramethylammonium hydroxide, tetraethylammonium hydroxide, tetrapropylammonium hydroxide, cetyltrimethylammonium bromide, oleic acid, sodium oleate, glycolipids, sophorolipids, sodium bis(2-ethylhexyl) sulfosuccinate.

In accordance with another variation of the process for the production of fluid for engine decontamination in accordance with the invention, the steps a) for synthesis of particles of metal oxides or oxyhydroxides or carbonates and b) for functionalization of the particles of metal oxides or oxyhydroxides or carbonates are carried out simultaneously in step a'). In this case, the sequence of steps for the production process becomes as follows:

a') synthesis of the particles of metal oxides or oxyhydroxides or carbonates and simultaneous functionalization of these particles, c) purification of the synthesised suspensions of particles of metal oxides or oxyhydroxides or carbonates, this purification being carried out by at least one of the following processes, applied alone or in combination: filtration, filtration-washing, rinsing, dialysis, d) dispersion of the functionalized particles of metal oxides or oxyhydroxides or carbonates in an aqueous solution containing at least one reducing agent or at least one precursor of a reducing agent for NOx following one of the modes below:

mechanical agitation with the aid of an agitator equipped with either a helical screw comprising a certain number of blades, or any other equipment which is known to provide effective stirring of the suspension, agitation with a high shear homogenizer-disperser, (such as, for example, an Ultra-Turrax™), agitation with a colloidal mill, e) dispersion with the aid of an ultrasound probe.

Step e) is either carried out as a function of the result and the efficiency obtained at the end of the mechanical dispersion step of step d) (in this case this step e) is optional), or carried out in place of the mechanical agitation step of step d).

In accordance with another variation of the process for the production of fluid for engine decontamination, step b) for functionalization of the particles of metal oxides or oxyhydroxides or carbonates is carried out by coating, i.e. by depositing a thin layer of a material with an isoelectric point (IEP) which is either more than 10.5 or less than 8 and preferably either more than 12 or less than 7. This coating may be used to stabilize the particles of metal oxides or oxyhydroxides or carbonates in the aqueous solution containing at least one reducing agent or at least one precursor of a reducing agent for NOx.

In accordance with a particular variation of the process for the production of fluid for engine decontamination, when the metallic particles are particles of oxides or oxyhydroxides or carbonates of iron, in the functionalization step, the iron oxide particles are coated with a thin layer of silica or a thin layer of gadolinium or a thin layer of gold or any other metal oxide for which the IEP is either more than 10.5 or less than 8, and preferably either more than 12 or less than 7.

The step a) for synthesis of particles of oxides of iron may be carried out using "physical" methods which consist of syntheses under vacuum (steam condensation method, thermal evaporation method, etc) or chemical syntheses which concern syntheses in liquid media. Preferably, the particles of iron oxides are synthesized by a chemical pathway: co-precipitation of iron salts, or the sol-gel pathway, the sonochemical pathway, microemulsion synthesis, or hydrothermal synthesis.

Preferably, the particles of iron oxides are obtained by co-precipitation of ferrous and ferric ions using a strong base.

In the variation in which the synthesis step a) and the step b) for functionalization of the particles of oxides or oxyhydroxides are carried out simultaneously, said single step a') is carried out by co-precipitation in an alkaline medium of ferric and ferrous ions in the presence of dextran.

Finally, the present invention also concerns the use of engine decontamination fluid in an internal combustion engine of the diesel type, the injection of said fluid being carried out upstream of the SCR and PF systems for the treatment of exhaust gases (or of the single treatment system when these two are collected into a single module) and being operated in a regular manner as a function of the operational conditions of the engine.

DETAILED DESCRIPTION OF THE INVENTION

The invention consists of a multi-functional fluid for the decontamination of exhaust gases emitted by an internal combustion engine. The multi-functional fluid in accordance with the invention promotes either the continuous regeneration of the particulate filter or the combustion of soot during the active regeneration phases of the PF, or can be used to combine these two advantages.

This fluid incorporates a catalytic additive for regeneration of the particulate filter with an aqueous solution containing at least one reducing agent or at least one precursor of a reducing agent for NOx.

The fluid in accordance with the invention is in the form of a stable dispersion of metallic colloidal particles in an aqueous solution containing at least one reducing agent or at least one precursor of a reducing agent for NOx.

The term "stable" means that there is no phase separation over time.

More precisely, the colloidal particles do not aggregate so as to induce sedimentation of the aggregates produced over time. The colloidal dispersion in accordance with the present invention is thus stable over time.

More precisely, the fluid for the decontamination of heat engines, in particular diesel engines in accordance with the invention is in the form of a stable suspension comprising colloidal particles of one or more particles of metal oxides or oxyhydroxides or carbonates dispersed in an aqueous solution containing at least one reducing agent or at least one precursor of a reducing agent for the NOx, the metals of the metal oxides or oxyhydroxides or carbonates being selected from the following list of metals: Fe, Cu, Ni, Co, Zn, Mn, Ti, V, Sr, Pt, Ce, Ca, Li, Na, Nb, and preferably from the following sub-list: Fe, Cu, Ce, Sr.

More particularly, the term "oxides of iron" means the following oxidized forms, it being understood that this list is not limiting:

the iron oxide is in various forms in which the oxidation state of the iron is different:
iron II: wustite FeO,
iron III: haematite $\alpha$-$Fe_2O_3$, maghemite $\gamma$-$Fe_2O_3$,
iron II/iron III: magnetite $Fe_3O_4$
amorphous iron oxides may also be synthesised and are suitable for the application in accordance with the invention.
iron oxyhydroxides:
Fe III: goethite $\alpha$-FeO(OH), lepidocrocite $\gamma$-FeO(OH), feroxyhyte $\delta$-FeO(OH), akaganeite $\beta$-FeO(OH), ferrihydrite $Fe_5O_8 \cdot 4H_2O$, bernalite $Fe(OH)_3$, iron II: $Fe(OH)_2$
iron carbonates:
   siderite $FeCO_3$
   ankerite $Ca(Fe,Mg,Mn)(CO_3)_2$
   carbonate green rust $Fe_6(OH)_{12}CO_3.2H_2O$
   chukanovite $Fe_2(OH)_2CO_3$ In the context of the present invention, any of the forms of the iron oxides and oxyhydroxides or carbonates cited above are suitable, irrespective of whether these materials are of mineral or synthetic origin. Similarly, particles of ferrite, an iron oxide with a spinel structure of the $MFe_2O_4$ type in which M denotes a divalent metal ion such as $Fe^{2+}$, $Ni^{2+}$, $Co^{2+}$, are ideally suited to the envisaged application.

The stability of colloidal dispersions is dictated by the forces which are exerted between the particles. These forces are:
   Van der Waals forces which are always attractive,
   Electrostatic forces: these forces exist when the colloidal particles are electrically charged. The electrical charges of the colloidal particles may be due to isomorphic substitutions in the crystallographic structure of the colloidal particles or be due to the presence of ionisable groups at the surface of the particles (as is the case with oxides and oxyhydroxides or carbonates of iron or other metals). These forces may be repulsive, attractive or zero depending on the physico-chemical conditions such as the pH of the aqueous solution, the concentration and the nature of the salts in solution. As an example, in the case of metal oxides, depending on the pH of the aqueous medium, the ionisable groups at the surface of the particles may lead to the existence of positive or negative charges. There is a pH at which the electrical charges (positive and negative) present at the surface compensate for one another: the electrostatic forces then become zero. In this precise case, because the electrical charge density is too low or even zero, the stability of dispersions of colloidal oxide particles is no longer guaranteed if only Van der Waals forces exist.
   Repulsive steric forces, which are repulsive interparticulate forces. These forces exist when the molecules (such as molecules of dextran, or polymer in general) have been grafted or adsorbed onto the surface of the particles.

In general, when preparing the decontamination fluid with colloidal particles of a material with an isoelectric point which is either more than 12 or less than 7, the particles may be dispersed directly in an aqueous solution the pH of which is in the range 9 to 10 and containing at least one reducing agent or at least one precursor of a reducing agent for NOx. In a variation of the invention, the colloidal particles may be dispersed directly in a solution of AdBlue®. It is also possible to use the pathways described above for the iron oxides and oxyhydroxides or carbonates (functionalization by an organic pathway or coating with a layer of silica, or another metal oxide).

In the case of iron oxides such as hematite, maghemite, the isoelectric point (abbreviated to IEP), i.e. the pH corresponding to a zero electric charge, is in the range 7 to 8. For the dispersions of iron oxide particles to be stable as regards aggregation and sedimentation, the particles must be dispersed in an aqueous solution the pH of which is sufficiently far from the isoelectric point for the resulting electrostatic forces to be able to ensure good dispersion of the particles by preventing aggregation of these particles. Thus, it is generally assumed that, in order to provide stable dispersions of colloidal particles, it is necessary for the pH to be lower than the IEP of the material by 2 pH units, or for the pH to be higher than the IEP of the material by 2 pH units.

In the case of dispersions of colloidal iron oxide particles mentioned above, then, the particles must be dispersed in aqueous fluids with a pH of less than 5, or more than 10.

The present invention consists of a stable dispersion of colloidal particles of iron oxides in an aqueous solvent the pH of which is in the range 9 to 10, and more particularly to disperse the particles of iron oxides in a solution of AdBlue®, for example. Thus, it is necessary to find one or more means for preventing aggregation of the particles of iron oxides.

Among the solutions for preventing aggregation of the particles, the colloidal particles may be functionalized, either by grafting onto their surface organic molecules providing a repulsion which is either of electrostatic origin, or steric, or electro-steric between the particles, or by coating them with a thin layer of a material with an isoelectric point (IEP) which is sufficiently far from the pH zone in the range 9 to 10.

The functionalization of the colloidal particles of iron for preparing stable suspensions in the envisaged pH range may be carried out in various manners:
   In a first step, it is possible to synthesise particles of oxides of iron. Once the synthesis has been carried out, the particles are functionalized or coated in a second step.
   The particles of oxides of iron may be synthesized and functionalized during the same step.
   It is possible to prepare suspensions of particles of oxides of iron from powders which are dispersed in aqueous solutions in a pH range for which the surface groups are ionized. In a second step, the organic molecules are adsorbed in a manner such as to generate repulsions of either electrostatic origin, or steric origin, or electrosteric origin between the particles, or the particles are coated with a material such as silica in a manner such that the particles are stable for pHs in the range 9 to 10.

In the options in which the preparation of the stable suspensions involves a step for the synthesis of particles of oxides of iron, there are various pathways for the synthesis of particles of oxides of iron in the literature:
   As an example, synthesis of the particles of iron oxide using the Massart process may be cited:
      This synthesis consists of co-precipitating iron II and iron III under stoichiometric conditions, this co-precipitation taking place in an acidic medium. Typically, 85.4 g of $(2FeCl_3,6H_2O)$ is added to 170 mL of a solution of 1.5 M hydrochloric acid in which 31.41 g of $FeCl_2,4H_2O$ has been dissolved. The particles obtained are aggregates of particles of magnetite ($Fe_3O_4$). These particles of magnetite may be transformed into particles of maghemite ($\gamma$-$Fe_2O_3$) by oxidation. To this end, decanting is carried out on a magnetic plate in a 2M solution of nitric acid. The cationic flocculant of surface-oxidized magnetite is decanted onto a magnetic plate then redispersed with agitation for 30 minutes in a 0.33 M solution of hydrated nitrate of iron heated to 100° C. In this manner, particles of maghemite are obtained which may either be redispersed in acidic medium (for example a nitric acid solution) or in a basic medium (for example a potassium hydroxide solution).

The suspensions of particles obtained by this synthesis are stable for pHs of less than 4 or for pHs of more than 10. In order to obtain suspensions of such completely stable particles for pHs in the range 7 to 11, it is necessary to adsorb onto the surface of the particles either molecules which induce repulsive steric forces or molecules which carry ionized groups at pHs in the range 7 to 11, generating forces which are either electrostatic or repulsive electrosteric forces. As an example, it is possible to adsorb onto the surface of the maghemite particles molecules of trisodium citrate which have pKas of 2.8, 4.3 and 5.7. Thus, for pHs of more than 7, the carboxylic functions of the trisodium citrate carry three negative charges, thereby ensuring an electrostatic repulsion between the particles of maghemite, preventing their aggregation.

It is also possible to carry out the synthesis of particles of iron oxide directly functionalized by a macromolecule. An example of such a synthesis is that described by Molday and Mackenzie in an article which appeared in 1982 (the complete reference for which is: Molday R. S., Mackenzie D., Immunospecific ferromagnetic iron-dextran reagents for the labeling and magnetic separation of cells, *J. Immunol. Methods,* 1982).

Said synthesis consists of co-precipitating ferric chloride and ferrous chloride (in a ratio by weight of 2.4) in a 50% by weight dextran solution. During agitation, a base is added such as, for example, an ammoniacal solution (with a concentration of 7.5% v/v), with the entirety being heated to a temperature in the range 60° C. to 65° C. This type of synthesis can be used to obtain colloidal particles of magnetite stabilized by steric repulsions induced by the dextran adsorbed at the surface of the particles.

Among the processes for obtaining stable dispersions of iron oxides or oxyhydroxides or carbonates (or, in general, metal oxides or oxyhydroxides or carbonates) at pHs in the range 9 to 10 are also those which consist of coating the particles with a thin layer of a material the isoelectric point of which is sufficiently far from the pH zone in the range 9 to 10. Coating may be carried out with silica, gold or latex.

In accordance with the invention, any type of synthesis for the particles of iron oxides or oxyhydroxides or carbonates described in the literature may be suitable. The synthesis may include a step for functionalization of the particles of iron oxides or oxyhydroxides or carbonates so that these particles do not aggregate, and thus do not sediment out over time, in an aqueous solution the pH of which is in the range 7 to 11, preferably in the range 8.5 to 10.5.

The functionalization of particles of metal oxides or oxyhydroxides or carbonates may be carried out after the synthesis or the redispersion of the powder of particles by adsorbing different molecules. The functionalization of the particles of metal oxides or oxyhydroxides or carbonates is carried out by using organic ionic polymer type molecules carrying at least one of the following chemical groups: amine, carboxylate, phosphate, sulfate, sulfonate, or of the non-ionic polymer type: polyoxyethylenes, sugars, polysaccharides, dextran, starch.

In accordance with another variation of the process for the production of fluid for engine decontamination in accordance with the invention, the functionalization of the particles of metal oxides or oxyhydroxides or carbonates is carried out by using organic molecules selected from the following list: citric acid, trisodium citrate, gluconic acid, dimercaptosuccinic acid, phosphocholine, the sodium salt of 4,5-dihydroxy-1,3-benzene disulfonic acid (Tiron), polysulfobetain, poly(sulfobetain methacrylate), poly(sulfobetain methacrylamide), dextran, carboxymethyl dextran, alginate, chitosan, polyvinyl alcohol (PVA), polyvinylpyrrolidone, polyethylene glycol, poly(acrylic acid), sodium polyacrylate, poly(methacrylic acid), sodium polymethacrylate, polymethacrylamide, polyacrylamide, ethylcellulose, poly(ethylene oxide), polyethyleneimine, polycaprolactone.

In accordance with another variation of the process for the production of fluid for engine decontamination in accordance with the invention, the functionalization of the particles of metal oxides or oxyhydroxides or carbonates is carried out by using surfactant type molecules selected from the following list: quaternary ammonium, tetramethylammonium hydroxide, tetraethylammonium hydroxide, tetrapropylammonium hydroxide, cetyltrimethylammonium bromide, oleic acid, sodium oleate, glycolipids, sophorolipids, and sodium bis(2-ethylhexyl) sulfosuccinate.

The metal oxides or oxyhydroxides or carbonates used in the fluid in accordance with the invention may be particles of cerium oxide or oxyhydroxides or carbonates. In this case, the process for the production of fluid for engine decontamination consists of the following sequence of steps:

a) synthesis of colloidal particles of cerium oxide or oxyhydroxides or carbonates, b) functionalization of the particles of cerium oxide or oxyhydroxides or carbonates with organic molecules in order to stabilize these particles in the aqueous solution containing at least one reducing agent or at least one precursor of a reducing agent for NOx, c) purification of the suspensions of particles of cerium oxide or oxyhydroxides or carbonates, this purification being carried out by at least one of the following processes, applied alone or in combination: filtration, or filtration-washing, or rinsing, or dialysis of the suspensions of particles of cerium oxides or oxyhydroxides or carbonates, d) dispersion of the functionalized cerium oxide or oxyhydroxides or carbonates in AdBlue® in accordance with one of the modes below:
   mechanical agitation with the aid of an agitator equipped with either a helical screw comprising a certain number of blades, or any other equipment which is known to provide effective stirring of the suspension,
   agitation with a high shear homogenizer-disperser (such as an Ultra-Turrax®, for example),
   agitation with a colloidal mill, e) dispersion with the aid of an ultrasound probe.

Step e) is either carried out as a function of the result and the efficiency obtained at the end of the mechanical dispersion step of step d) (in this case this step e) is optional), or carried out in place of the mechanical agitation step of step d).

Preferably, step b) for functionalization of the particles of cerium oxide or oxyhydroxides or carbonates is carried out using organic molecules which induce either steric repulsions or electrostatic repulsions, or electrosteric repulsions, these repulsions preventing the particles of cerium oxide or oxyhydroxides or carbonates from aggregating.

Preferably again, the step b) for functionalization of the particles of cerium oxide or oxyhydroxides or carbonates is carried out using organic molecules selected from the following list: citric acid, trisodium citrate the sodium salt of 4,5-dihydroxy-1,3-benzenedisulfonic acid (Tiron), polyethylene glycol, polyethylene glycol phosphonate, poly(acrylic acid), sodium polyacrylate, poly(methacrylic acid), sodium polymethacrylate, polymethacrylamide, polyacrylamide, and poly(ethylene oxide).

The step b) for functionalization of the particles of cerium oxide or oxyhydroxides or carbonates may also be carried out starting from surfactant type molecules which are selected from the following list: quaternary ammonium, tetramethylammonium hydroxide, tetraethylammonium hydroxide, tetrapropylammonium hydroxide, cetyltrimethylammonium bromide, and sodium bis(2-ethylhexyl) sulfosuccinate.

Regarding the synthesis step a), the particles of cerium oxide may be synthesised using the method described in patent application 2 596 380 by Chane-Ching and Le Loarer.

EXAMPLES IN ACCORDANCE WITH THE INVENTION

The following examples demonstrate different embodiments of the production of the product in accordance with the invention and the advantages of the product in accordance with the invention. The two examples given in the case of iron oxides do not constitute a limitation of the present invention to said iron oxides.

Example 1: Dispersion of $Fe_3O_4$ in Adblue®

We began by characterizing the suspension of 5% w/w $Fe_3O_4$ stabilized with sodium citrate. Adding sodium citrate meant that a stable suspension was obtained with a basic pH: the pH of the suspension of $Fe_3O_4$ was equal to 8.1. To measure the size, we diluted a portion of the stock suspension in a basic solution in order to provide an equivalent concentration of iron of 500 ppm; the pH of this diluted suspension was 9.

The diameter of the particles was measured by dynamic light diffusion (DLD). The particles were monomodal in size and the mean diameter of the $Fe_3O_4$ particles was equal to 45 nm.

Next, we diluted the suspension of $Fe_3O_4$ in a volume of AdBlue® in a manner such that the final concentration of iron in the suspension was equal to 350 ppm.

The pH of the suspension of particles of $Fe_3O_4$ in AdBlue® was equal to 9.5.

The stability of the suspension of $Fe_3O_4$ in AdBlue® was verified by measuring the turbidity of the suspension. The measurement consisted of monitoring the change with time of the transmission of a beam of light through a suspension of particles over the entire height of the sample. This measurement was sufficient to detect any instability in a colloidal suspension (for example, sedimentation of the particles). This measurement was carried out with the aid of a commercial instrument known as a Turbiscan®. When this measurement was carried out on the suspension of particles of $Fe_3O_4$ dispersed in AdBlue®, it was observed that the profile of the intensity transmitted through the glass tube containing the suspension was flat: the value for the transmitted light intensity was constant over the entire height of the tube, which indicated that there was no sedimentation during that period.

The size of the $Fe_3O_4$ particles dispersed in the AdBlue® was measured by DLD.

The distribution of the particles of $Fe_3O_4$ in the AdBlue® was still monomodal.

The mean diameter was 53.5 nm. It was observed that the particles of $Fe_3O_4$ remained nanometric in size and thus could not sediment out. This observation was in agreement with the measurement carried out with the Turbiscan, which showed that the dispersion was stable. This example demonstrates that it is possible to disperse particles of oxides of iron ($Fe_3O_4$) in AdBlue® and obtain a suspension which is stable over time.

Example 2: Dispersion of $Fe_2O_3$ in a Solution of Adblue®

We characterized the suspension of 3% w/w $Fe_2O_3$ stabilized with sodium citrate: adding sodium citrate meant that a stable suspension was obtained with a basic pH.

The pH of the suspension of $Fe_2O_3$ was equal to 8.4.

To measure the size, we diluted a portion of the stock suspension in a basic solution in order to provide an equivalent concentration of iron of 500 ppm; the pH of this diluted suspension was 8.7. The diameter of the particles was measured by dynamic light diffusion (DLD). The particles were monomodal in size and the mean diameter of the $Fe_2O_3$ particles was equal to 53 nanometres.

Next, we diluted the suspension of $Fe_2O_3$ in a volume of AdBlue® in a manner such that the final concentration of iron in the suspension was equal to 350 ppm. The pH of the suspension in the AdBlue® was equal to 9.

The size of the $Fe_2O_3$ particles dispersed in the AdBlue® was measured by DLD.

The distribution of the particles of $Fe_2O_3$ in the AdBlue® was still monomodal. The mean diameter was 78 nm. It was observed that the particles of $Fe_2O_3$ dispersed in the AdBlue® remained nanometric in size and thus could not sediment out. This example demonstrates that it is possible to disperse particles of oxides of iron ($Fe_2O_3$) in AdBlue® and obtain a suspension which is stable.

The invention claimed is:

1. A fluid for the decontamination of heat engines, in order to be able to carry out the selective catalytic reduction of oxides of nitrogen contained in exhaust gases as well as assisting in the regeneration of the particulate filter by catalytic combustion of particles of soot deposited in the particulate filter (the function termed assistance in the regeneration of PF), said fluid being in the form of a stable suspension comprising colloidal particles of one or more particles of metal oxides or oxyhydroxides or metal carbonates dispersed in an aqueous solution containing at least one reducing agent or at least one precursor of a reducing agent for the NOx, the metals of the metal oxides or oxyhydroxides or carbonates being selected from the following list of metals: Fe, Cu, Ni, Co, Zn, Mn, Ti, V, Sr, Pt, Ce, Ca, Li, Na, Nb, and in which the iron oxyhydroxides, used alone or as a mixture, are selected from the following list: goethite α-FeO(OH), lepidocrocite γ-FeO(OH), feroxyhyte δ-FeO(OH), akaganeite β-FeO(OH), ferrihydrite $Fe_5O_8 \cdot 4H_2O$, bernalite $Fe(OH)_3$, and ferrous hydroxide $Fe(OH)_2$.

2. A fluid for the decontamination of heat engines, in order to be able to carry out the selective catalytic reduction of oxides of nitrogen contained in exhaust gases as well as assisting in the regeneration of the particulate filter by catalytic combustion of particles of soot deposited in the particulate filter (the function termed assistance in the regeneration of PF), said fluid being in the form of a stable suspension comprising colloidal particles of one or more particles of metal oxides or oxyhydroxides or metal carbonates dispersed in an aqueous solution containing at least one reducing agent or at least one precursor of a reducing agent for the NOx, the metals of the metal oxides or oxyhydroxides or carbonates being selected from the following list of metals: Fe, Cu, Ni, Co, Zn, Mn, Ti, V, Sr, Pt, Ce, Ca, Li, Na, Nb, and in which the aqueous solution containing a reducing compound or reducing agent precursor is urea, 32.5±0.7% by weight in solution in purified water and complies with the specifications of the standard ISO 22241-1.

3. The fluid for the decontamination of heat engines, in particular diesel engines, as claimed in claim 2, in which the aqueous solution containing a NOx reducing compound is a 32.5% by weight solution of urea in purified water.

4. A fluid for the decontamination of heat engines, in order to be able to carry out the selective catalytic reduction of oxides of nitrogen contained in exhaust gases as well as assisting in the regeneration of the particulate filter by catalytic combustion of particles of soot deposited in the particulate filter (the function termed assistance in the regeneration of PF), said fluid being in the form of a stable suspension comprising colloidal particles of one or more particles of metal oxides or oxyhydroxides or metal carbonates dispersed in an aqueous solution containing at least one reducing agent or at least one precursor of a reducing agent for the NOx, the metals of the metal oxides or oxyhydroxides or carbonates being selected from the following list of metals: Fe, Cu, Ni, Co, Zn, Mn, Ti, V, Sr, Pt, Ce, Ca, Li, Na, Nb, and in which the concentration of metal oxides or oxyhydroxides or metal carbonates is such that the concentration of metal ions in the solution of the reducing compound or precursor of a reducing agent is in the range 10 to 10000 ppm.

5. A process for the production of a fluid for engine decontamination in order to be able to carry out the selective catalytic reduction of oxides of nitrogen contained in exhaust gases as well as assisting in the regeneration of the particulate filter by catalytic combustion of particles of soot deposited in the particulate filter (the function termed assistance in the regeneration of PF), the fluid being in the form of a stable suspension comprising colloidal particles of one or more particles of metal oxides or oxyhydroxides or metal carbonates dispersed in an aqueous solution containing at least one reducing agent or at least one precursor of a reducing agent for NOx, the metals of the metal oxides or oxyhydroxides or carbonates being selected from the following list of metals: Fe, Cu, Ni, Co, Zn, Mn, Ti, V, Sr, Pt, Ce, Ca, Li, Na, Nb, comprising the following sequence of steps:
  a) synthesis of particles of metal oxides or oxyhydroxides or carbonates,
  b) functionalization of the particles of metal oxides or oxyhydroxides or carbonates by organic molecules or by coating in order to stabilize the particles in the aqueous solution containing at least one reducing agent or at least one precursor of a reducing agent for NOx,
  c) purification by filtration, or filtration-washing, or rinsing, or dialysis, the processes being applied alone or in combination, of the suspensions of particles of metal oxides or oxyhydroxides or carbonates,
  d) dispersion of the functionalized metal oxides or oxyhydroxides or carbonates in 32.5% by weight solution of urea in purified water in accordance with one of the modes below:
    mechanical agitation with the aid of an agitator equipped with either a helical screw comprising a certain number of blades, or any other equipment which is known to provide effective stirring of the suspension,
    agitation with a high shear homogenizer-disperser,
    agitation with a colloidal mill,
  e) dispersion with the aid of an ultrasound probe, step e) either being carried out as a function of the result and the efficiency obtained at the end of the mechanical dispersion step of step d) (in this case this step e) is optional), or carried out in place of the mechanical agitation step of step d).

6. The process for the production of fluid for engine decontamination as claimed in claim 5, in which the oxides of iron are selected from the following list, used alone or as a mixture:
  wustite FeO, haematite α-$Fe_2O_3$, maghemite γ-$Fe_2O_3$ and magnetite.

7. The process for the production of fluid for engine decontamination as claimed in claim 5, in which at least one of the reducing compounds or at least one of the precursors of a reducing agent in aqueous solution is selected from urea, ammonia, formamide, and ammonium salts, in particular ammonium formate, ammonium carbamate, and guanidine salts, in particular guanidinium formate.

8. The process for the production of fluid for engine decontamination as claimed in claim 5, in which step b) for the functionalization of the particles of metal oxides or oxyhydroxides or carbonates is carried out by using organic ionic polymer type molecules carrying at least one of the following chemical groups:
  amine, carboxylate, phosphate, sulfate, sulfonate, or using non-ionic polymer types:
  polyoxyethylenes, sugars, polysaccharides, dextran, starch.

9. The process for the production of fluid for engine decontamination as claimed in claim 5, in which step b) for functionalization of the particles of metal oxides or oxyhydroxides or carbonates is carried out by using organic molecules selected from the following list: citric acid, trisodium citrate, gluconic acid, dimercaptosuccinic acid, phosphocholine, the sodium salt of 4,5-dihydroxy-1,3-benzenedisulfonic acid (Tiron), polysulfobetain, poly(sulfobetain methacrylate), poly(sulfobetain methacrylamide), dextran, carboxymethyl dextran, alginate, chitosan, polyvinyl alcohol (PVA), polyvinylpyrrolidone, polyethylene glycol, poly(acrylic acid), sodium polyacrylate, poly(methacrylic acid), sodium polymethacrylate, polymethacrylamide, polyacrylamide, ethylcellulose, poly(ethylene oxide), polyethyleneimine, polycaprolactone.

10. The process for the production of fluid for engine decontamination as claimed in claim 5, in which step b) for functionalization of the particles of metal oxides or oxyhydroxides or carbonates is carried out by using surfactant type molecules selected from the following list: quaternary ammonium, tetramethylammonium hydroxide, tetraethylammonium hydroxide, tetrapropylammonium hydroxide, cetyltrimethylammonium bromide, oleic acid, sodium oleate, glycolipids, sophorolipids, sodium bis(2-ethylhexyl) sulfosuccinate.

11. The process for the production of fluid for engine decontamination as claimed in claim 5, in which the steps a) for synthesis of the particles of metal oxides or oxyhydroxides or carbonates and b) for functionalization of the particles of metal oxides or oxyhydroxides or carbonates are carried out simultaneously.

12. The process for the production of fluid for engine decontamination as claimed in claim 5, in which step b) for functionalization of the particles of metal oxides or oxyhydroxides or carbonates is carried out by coating, i.e. by depositing a thin layer of a material with an isoelectric point (IEP) which is either more than 10.5 or less than 8.

13. The process for the production of fluid for engine decontamination as claimed in claim 12 in which, when the colloidal particles are particles of oxides or oxyhydroxides or carbonates of iron, the functionalization step b) is carried out by coating the particles of iron oxides, oxyhydroxides or carbonates with a thin layer of silica or a thin layer of gadolinium or a thin layer of gold or with any other metal oxide for which the IEP is either more than 10.5 or less than 8.

14. A method of engine decontamination in an internal combustion engine of the diesel type, comprising carrying out selective catalytic reduction (SCR) of oxides of nitrogen contained in exhaust gases as well as assisting in regeneration of a particulate filter by catalytic combustion of particles of soot deposited in the particulate filter (the function termed assistance in the regeneration of PF), by injecting, upstream of the SCR and PF systems for the treatment of exhaust gases, a fluid being in the form of a stable suspension comprising colloidal particles of one or more particles of metal oxides or oxyhydroxides or metal carbonates dispersed in an aqueous solution containing at least one reducing agent or at least one precursor of a reducing agent for the NOx, the metals of the metal oxides or oxyhydroxides or carbonates being selected from the following list of metals: Fe, Cu, Ni, Co, Zn, Mn, Ti, V, Sr, Pt, Ce, Ca, Li, Na, Nb, and operating in a regular manner as a function of the operational conditions of the engine.

15. The process for the production of fluid for engine decontamination as claimed in claim 5, in which the metals of the metal oxides or oxyhydroxides or carbonates comprise metals selected from the following list of metals: Fe, Cu, Ce, Sr.

16. The process for the production of fluid for engine decontamination as claimed in claim 5, in which step b) for functionalization of the particles of metal oxides or oxyhydroxides or carbonates is carried out by coating, i.e. by depositing a thin layer of a material with an isoelectric point (IEP) which is either more than 12 or less than 7.

17. The process for the production of fluid for engine decontamination as claimed in claim 16 in which, when the colloidal particles are particles of oxides or oxyhydroxides or carbonates of iron, the functionalization step b) is carried out by coating the particles of iron oxides, oxyhydroxides or carbonates with a thin layer of silica or a thin layer of gadolinium or a thin layer of gold or with any other metal oxide for which the IEP is either more than 12 or less than 7.

18. The process for the production of fluid for engine decontamination as claimed in claim 5, in which the concentration of metal oxides or oxyhydroxides or metal carbonates is such that the concentration of metal ions in the solution of the reducing compound or precursor of a reducing agent is in the range 10 to 5000 ppm.

19. The process for the production of fluid for engine decontamination as claimed in claim 5, in which the concentration of metal oxides or oxyhydroxides or metal carbonates is such that the concentration of metal ions in the solution of the reducing compound or precursor of a reducing agent is in the range 10 to 2000 ppm.

20. The process for the production of fluid for engine decontamination as claimed in claim 5, in which the iron oxyhydroxides, used alone or as a mixture, are selected from the following list: goethite $\alpha$-FeO(OH), lepidocrocite $\gamma$-FeO(OH), feroxyhyte $\delta$-FeO(OH), akaganeite $\beta$-FeO(OH), ferrihydrite $Fe_5O_8$-$4H_2O$, bernalite $Fe(OH)_3$, and ferrous hydroxide $Fe(OH)_2$.

21. The process for the production of fluid for engine decontamination as claimed in claim 5, in which the concentration of metal oxides or oxyhydroxides or metal carbonates is such that the concentration of metal ions in the solution of the reducing compound or precursor of a reducing agent is in the range 10 to 10000 ppm.

\* \* \* \* \*